(12) United States Patent
Igarashi

(10) Patent No.: US 12,229,986 B2
(45) Date of Patent: Feb. 18, 2025

(54) INFORMATION PROCESSING APPARATUS, INFORMATION PROCESSING METHOD, AND STORAGE MEDIUM FOR DISPLAYING AM IMAGE INDICATING A PIXEL WHERE A LUMINANCE CHANGE OCCURS BASED ON A SIGNAL

(71) Applicant: CANON KABUSHIKI KAISHA, Tokyo (JP)

(72) Inventor: Kenta Igarashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 261 days.

(21) Appl. No.: 17/834,713

(22) Filed: Jun. 7, 2022

(65) Prior Publication Data
US 2022/0398770 A1    Dec. 15, 2022

(30) Foreign Application Priority Data

Jun. 10, 2021   (JP) .................................. 2021-097306

(51) Int. Cl.
  *G06T 7/73*   (2017.01)
  *G06T 7/246*  (2017.01)
  *H04N 5/265*  (2006.01)
  *H04N 5/272*  (2006.01)

(52) U.S. Cl.
  CPC ............... *G06T 7/73* (2017.01); *G06T 7/246* (2017.01); *H04N 5/265* (2013.01); *H04N 5/272* (2013.01)

(58) Field of Classification Search
  CPC .. G06T 7/73; G06T 7/246; G06T 7/20; H04N 5/265; H04N 5/272; H04N 23/80; H04N 23/71
  See application file for complete search history.

(56) References Cited

U.S. PATENT DOCUMENTS

| | | | | |
|---|---|---|---|---|
| 10,600,189 B1 * | 3/2020 | Bedikian | ................... | G06T 7/73 |
| 11,164,019 B1 * | 11/2021 | Ryan | ................... | G06V 40/161 |
| 2006/0153288 A1 * | 7/2006 | Prochnow | ............. | H04N 19/51 |
| | | | | 375/E7.081 |
| 2007/0110307 A1 * | 5/2007 | Sato | ......................... | G06T 5/50 |
| | | | | 382/169 |
| 2010/0246975 A1 * | 9/2010 | Tsukiori | ............... | G06V 40/145 |
| | | | | 382/209 |
| 2014/0368558 A1 * | 12/2014 | Ikeda | ................... | G09G 3/3426 |
| | | | | 345/87 |
| 2016/0042238 A1 * | 2/2016 | Lynam | ................. | B60W 10/20 |
| | | | | 701/45 |

(Continued)

FOREIGN PATENT DOCUMENTS

| | | |
|---|---|---|
| JP | 2017091518 A | 5/2017 |
| JP | 2020072317 A | 5/2020 |

*Primary Examiner* — Chiawei Chen
(74) *Attorney, Agent, or Firm* — CANON U.S.A., INC. IP DIVISION

(57) ABSTRACT

An apparatus according to the present invention includes a detection unit configured to detect an event based on a signal indicating a location of a pixel where a luminance change occurs and time when the luminance change occurs, and a display control unit configured to display an image indicating the pixel where the luminance change occurs based on the signal. In a case where the event is not detected, the image includes additional information indicating the event previously detected.

20 Claims, 8 Drawing Sheets

(56) References Cited

U.S. PATENT DOCUMENTS

| | | | |
|---|---|---|---|
| 2016/0105596 A1* | 4/2016 | Hatakeyama | H04N 23/80 |
| | | | 348/239 |
| 2016/0210513 A1* | 7/2016 | Wang | G06V 40/10 |
| 2017/0054911 A1* | 2/2017 | Lee | H04N 23/633 |
| 2017/0084068 A1* | 3/2017 | Son | G06T 15/50 |
| 2019/0385428 A1* | 12/2019 | Bretschneider | G01B 11/026 |
| 2020/0226377 A1* | 7/2020 | Campos Macias | G06F 18/251 |
| 2021/0037178 A1* | 2/2021 | Rivard | H04N 23/743 |
| 2021/0327090 A1* | 10/2021 | Naganuma | G06T 7/80 |
| 2022/0036110 A1* | 2/2022 | Sironi | G06V 20/56 |
| 2022/0150435 A1* | 5/2022 | Numata | H04N 23/80 |
| 2022/0174200 A1* | 6/2022 | Xiong | H04N 23/80 |
| 2022/0375256 A1* | 11/2022 | Endo | H04N 23/76 |
| 2023/0217117 A1* | 7/2023 | Kaizu | H04N 25/47 |
| | | | 348/226.1 |
| 2023/0335043 A1* | 10/2023 | Nakata | G06F 3/14 |
| 2023/0353893 A1* | 11/2023 | Niikura | B05B 12/082 |
| 2024/0073552 A1* | 2/2024 | Miyatani | H04N 25/47 |
| 2024/0161503 A1* | 5/2024 | Taya | G06V 10/50 |

\* cited by examiner

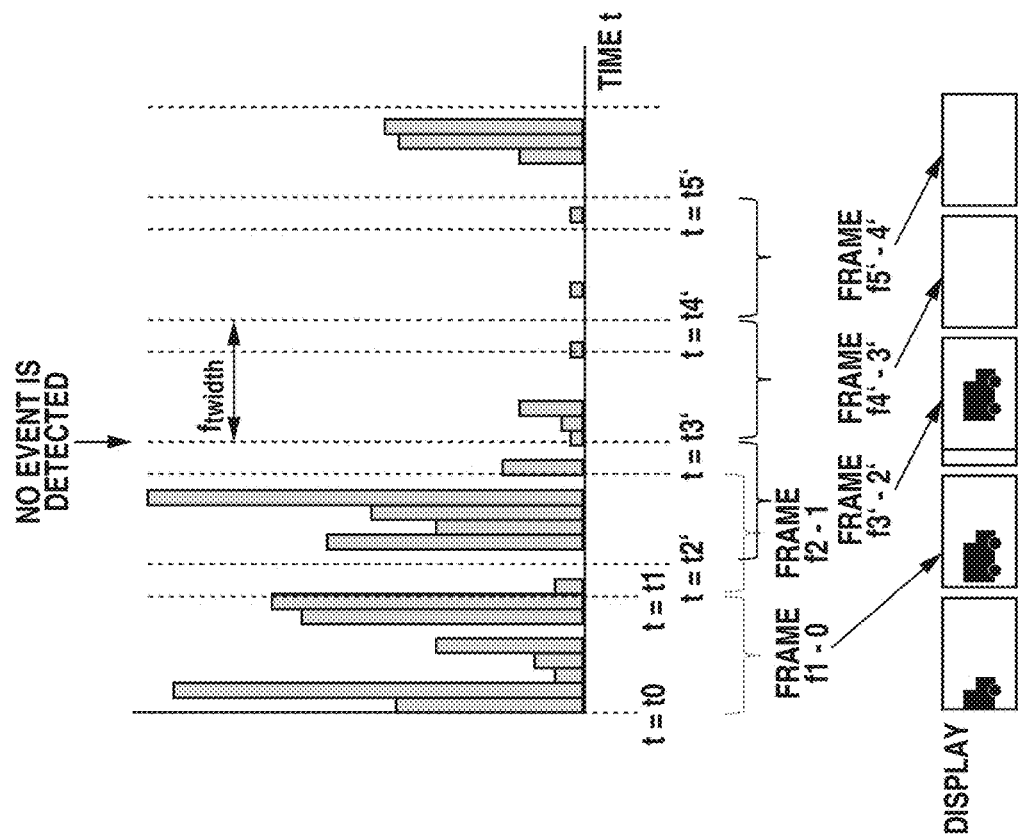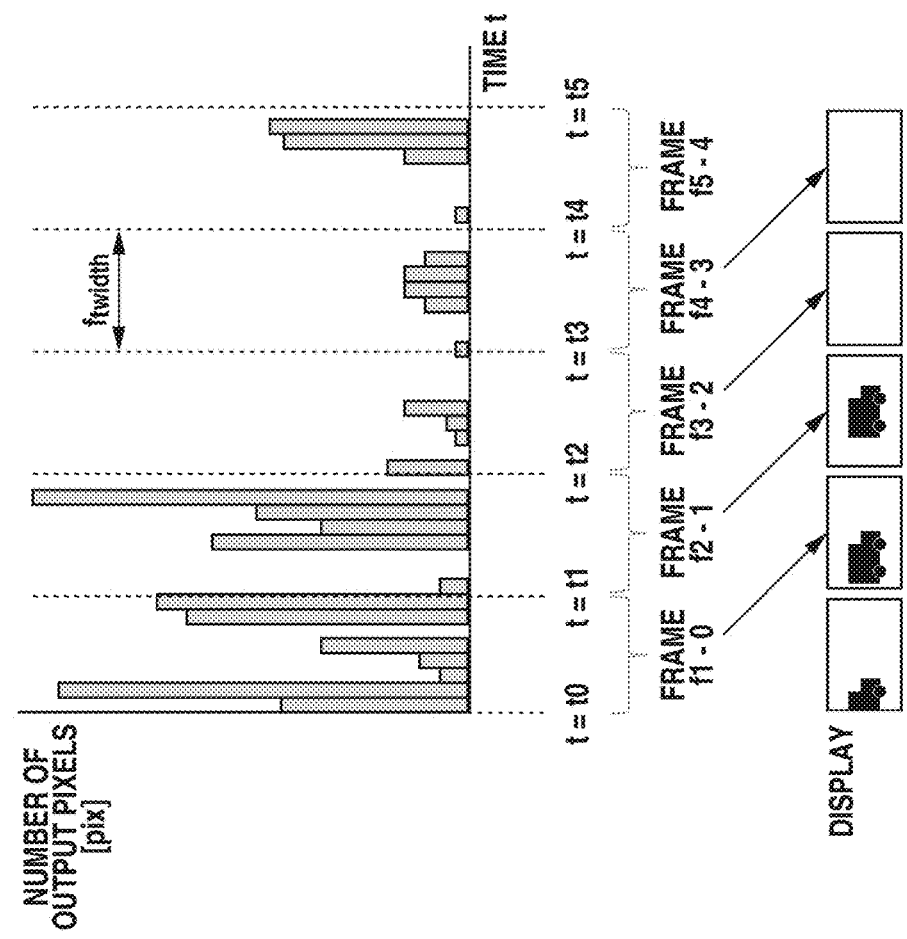

EXAMPLE OF EXTENDING FRAME GENERATION INTERVAL

EXAMPLE OF DYNAMICALLY CHANGING INTEGRATION INTERVAL

EXAMPLE OF CHANGING INTEGRATION PERIOD AFTER INTEGRATION UPPER LIMIT IS REACHED

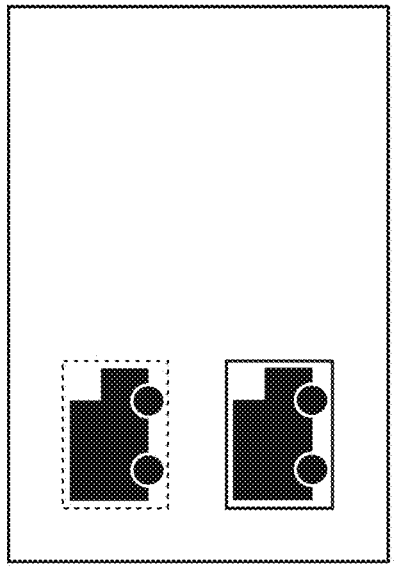

FIG.8C
DISPLAY OBJECT BY CHANGING HUE OF TRACKING FRAME

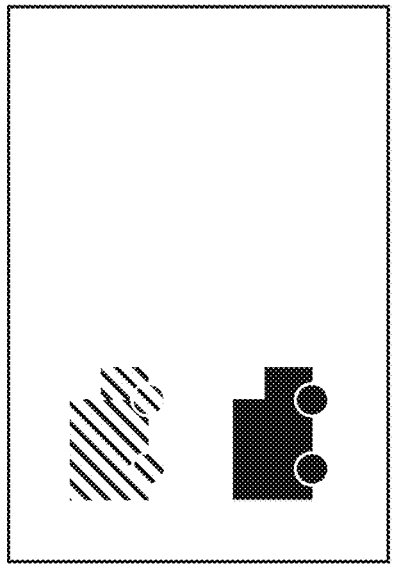

FIG.8B
DISPLAY OBJECT BY CHANGING SATURATION AND HUE

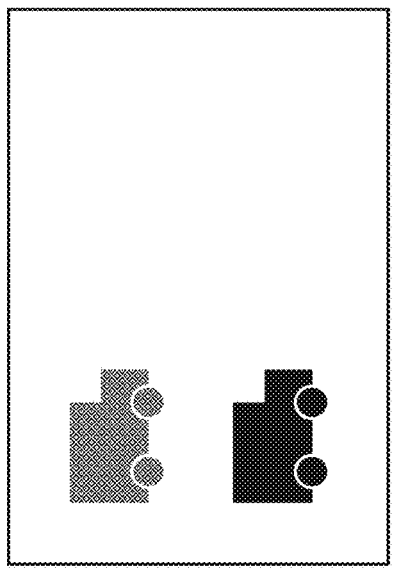

FIG.8A
DISPLAY OBJECT IN INTERMEDIATE COLOR BETWEEN COLOR WITH LUMINANCE CHANGE AND COLOR WITH NO LUMINANCE CHANGE

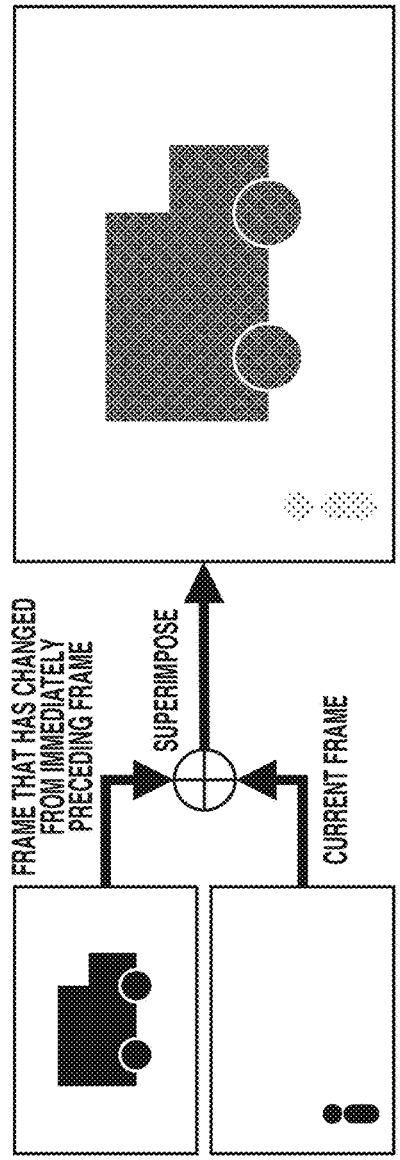

FIG.8E
DISPLAY CURRENT FRAME AND FRAME THAT HAS CHANGED FROM IMMEDIATELY PRECEDING FRAME IN SUPERIMPOSED MANNER

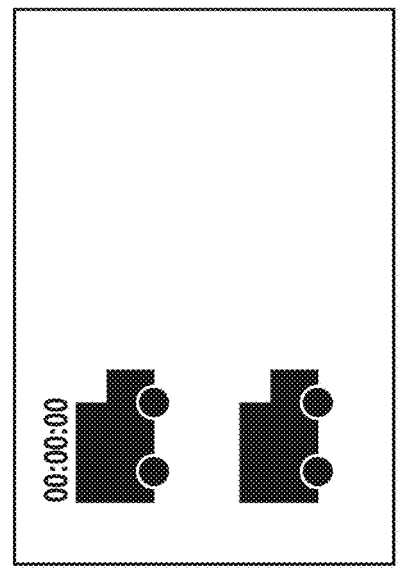

FIG.8D
ADDITIONALLY DISPLAY ELAPSED TIME SINCE OBJECT HAS STOPPED MOVING

INFORMATION PROCESSING APPARATUS, INFORMATION PROCESSING METHOD, AND STORAGE MEDIUM FOR DISPLAYING AM IMAGE INDICATING A PIXEL WHERE A LUMINANCE CHANGE OCCURS BASED ON A SIGNAL

BACKGROUND

Technical Field

The aspect of the invention relates to a technique for displaying an image using an event-based sensor.

Description of the Related Art

An event-based sensor that outputs in real time a change in luminance of each pixel as an address event signal is known (see Japanese Patent Application Laid-Open No. 2020-72317). A technique for integrating output signals in a certain period of time and converting the output signals into frames to generate an image based on an output from an event-based sensor is known (e.g., see Japanese Patent Application Laid-Open No. 2017-091518).

SUMMARY

According to an aspect of the embodiments, an apparatus includes a detection unit configured to detect an event based on a signal indicating a location of a pixel where a luminance change occurs and time when the luminance change occurs, and a display control unit configured to display an image indicating the pixel where the luminance change occurs based on the signal. In a case where the event is not detected, the image includes additional information indicating the event previously detected.

Further features of the disclosure will become apparent from the following description of exemplary embodiments with reference to the attached drawings.

BRIEF DESCRIPTION OF THE DRAWINGS

FIGS. 6A and 6B each schematically illustrate an example of a display frame generation method.

FIGS. 8A to 8E each schematically illustrate an example of the display frame generation method.

DESCRIPTION OF THE EMBODIMENTS

Synchronous-type photoelectric conversion elements that capture image data (frame) in synchronization with synchronous signals, such as vertical synchronous signals, have heretofore been used in image capturing apparatuses or the like. This typical synchronous-type photoelectric conversion element can acquire the image data only in each cycle of the synchronous signal (e.g., 1/60 seconds). Thus, it is difficult to deal with a case where faster processing is required in the field relating to traffic, a robot, or the like. In this regard, for example, Japanese Patent Application Laid-Open No. 2020-72317 discusses an asynchronous-type photoelectric conversion element including a detection circuit that is provided for each pixel and detects in real time as an address event that a variation in the amount of light of the pixel has exceeded a threshold, for each pixel address. The photoelectric conversion element that detects the address event for each pixel as described above is referred to as a dynamic vision sensor (DVS). In particular, an event-based camera is herein referred to as an event-based sensor.

An output signal from an image capturing apparatus using the above-described event-based sensor has heretofore been used for machine vision. However, there is a demand for frame-based display for the purpose of operation verification or the like during installation of the image capturing apparatus. According to a display method discussed in Japanese Patent Application Laid-Open No. 2017-091518, in a case where a subject stops operation for a certain period of time or longer, no address event occurs and no pixel output is acquired, so that the subject is not displayed for a long period of time in some cases. This makes it difficult to conduct an operation check or the like. The present invention has been made in view of such issues and is directed to generating a frame video signal with high visibility, particularly in a case where a subject is not moving, in an image capturing apparatus using a photoelectric conversion element that outputs signals asynchronously and displaying the resultant.

Exemplary embodiments of the present invention will be described in detail below with reference to the accompanying drawings. Configurations described in the following exemplary embodiments are merely examples. The present invention is not limited to the illustrated configurations.

Figure 1:
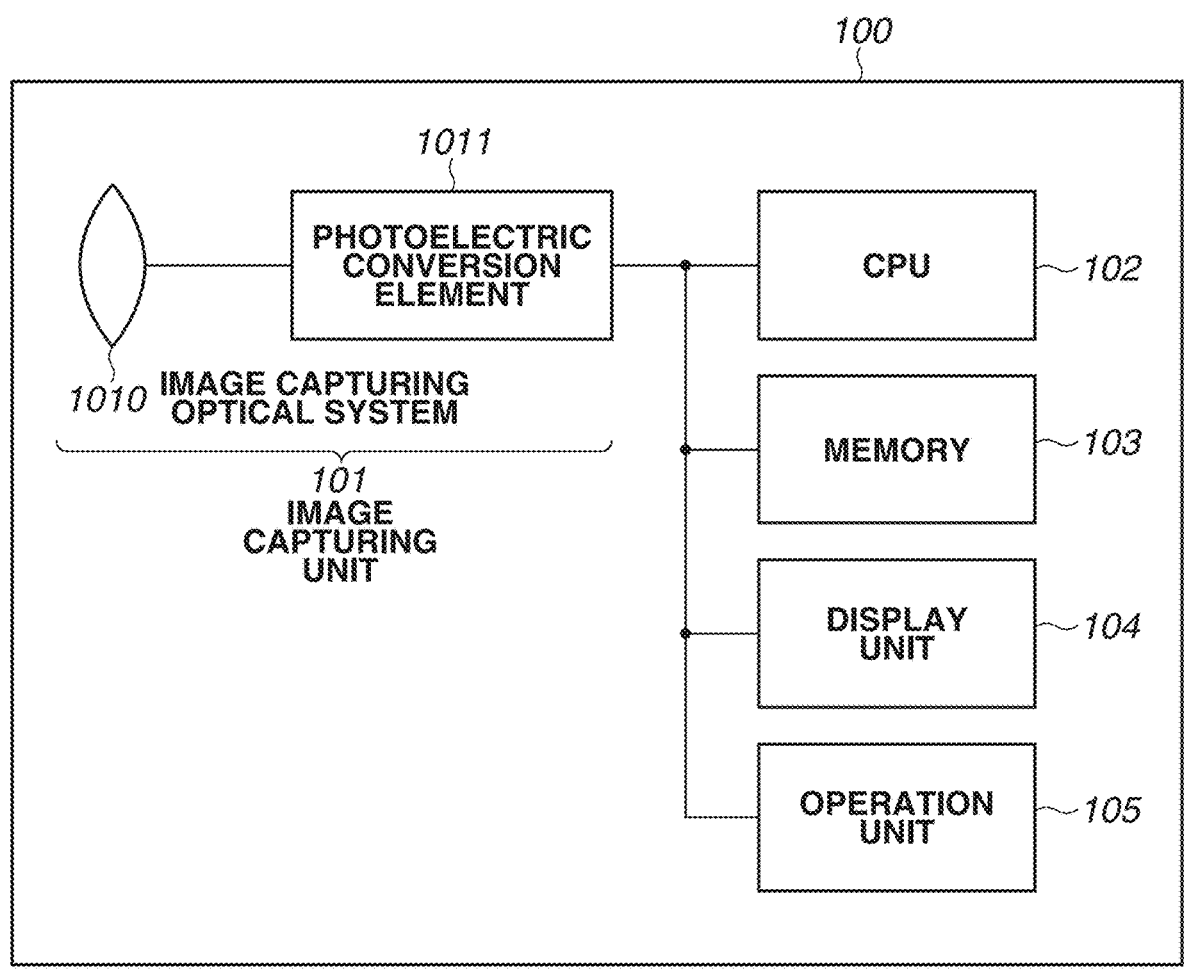
FIG. 1 is a block diagram illustrating a hardware configuration example of an information processing apparatus.

<Functional Configuration of Image Capturing Apparatus 100: FIG. 1>

A first exemplary embodiment of the present invention will be described below. FIG. 1 is a schematic diagram illustrating a hardware configuration example of an image capturing apparatus (information processing apparatus) 100.

Specifically, the image capturing apparatus 100 is an image capturing apparatus including an event-based sensor. A function of performing image processing and a function of executing analysis processing (motion detection) on an image may be included in different apparatuses, respectively. The image capturing apparatus 100 includes an image capturing unit 101, which includes an image capturing optical system 1010 and a photoelectric conversion element 1011, a central processing unit (CPU) 102, a memory 103, a display unit 104, and an operation unit 105. The photoelectric conversion element 1011 is an event-based sensor that outputs an address event signal based on received incident light. The event-based sensor detects a change in luminance of each pixel as an event. The address event signal indicates a location of a pixel where a luminance change occurs and time when the luminance change occurs. Specifically, the image capturing optical system 1010 is a light-receiving lens that receives incident light and forms an image on the photoelectric conversion element 1011. The CPU 102 reads out an operating system (OS) and other programs stored in the memory 103 and executes the OS and programs. The CPU 102 controls the components connected to the CPU 102 and performs calculations, logical determination, and the like for various processing. Examples of processing to be executed by the CPU 102 include information processing according to the present exemplary embodiment.

The CPU 102 also controls focus driving and aperture driving for the image capturing optical system 1010, driving of the photoelectric conversion element 1011, and the like. Examples of the memory 103 include a hard disk drive and an external storage apparatus. The memory 103 stores programs and various data on information processing according to the present exemplary embodiment. The display unit 104 is, for example, a display apparatus that displays calculation results and the like made by the image capturing apparatus 100 in response to an instruction from the CPU 102. Any type of display apparatus, such as a liquid crystal display apparatus, a projector, or a light-emitting diode (LED) indicator, can be used as the display unit 104. Examples of the operation unit 105 include a touch panel, a keyboard, a mouse, and a robot controller. The operation unit 105 is a user interface that receives an instruction input by a user. The image capturing apparatus 100 may include a mechanism other than the above-described hardware configuration.

Figure 2A:
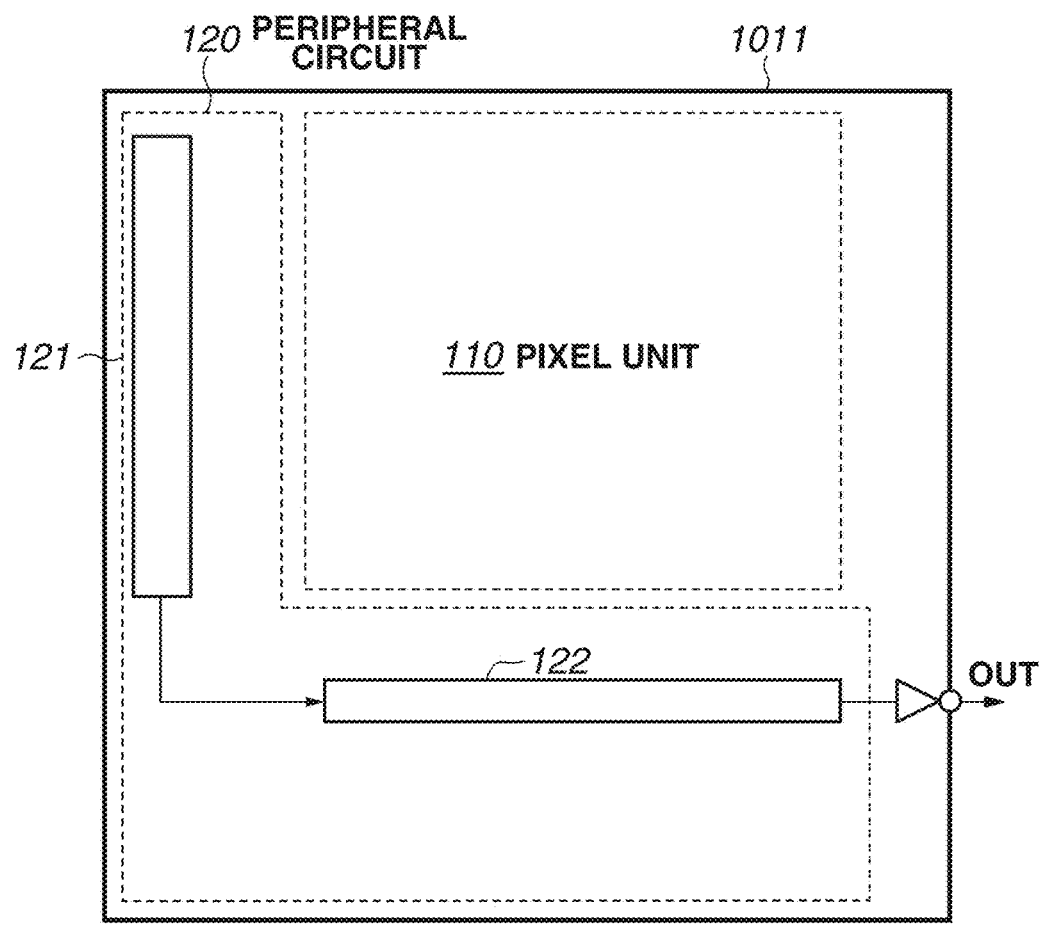
FIGS. 2A and 2B each illustrate a configuration example of an event-based sensor.
Figure 2B:
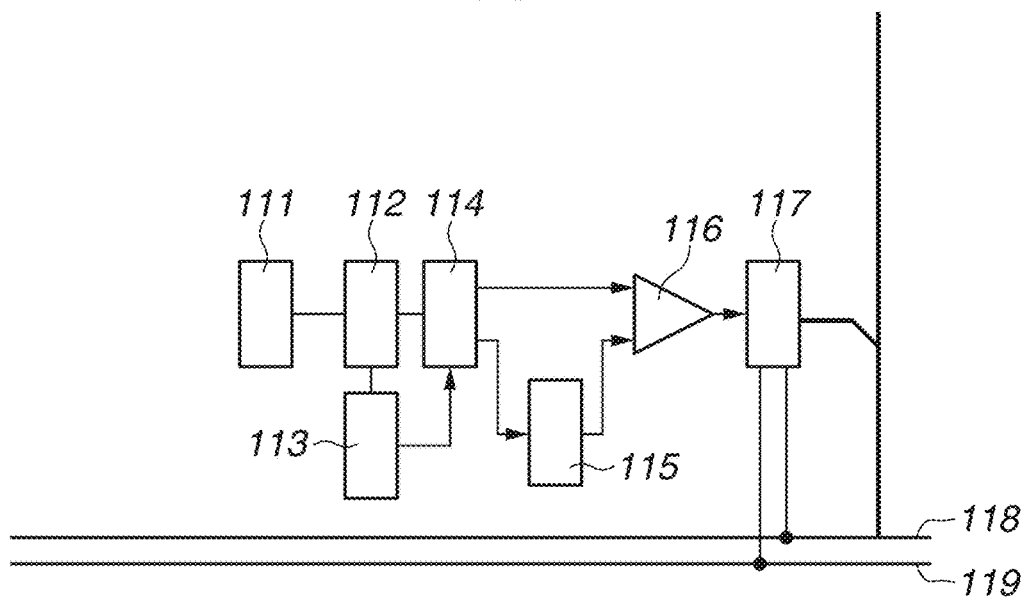

<Photoelectric Conversion Element 1011: FIGS. 2A and 2B>

An example of the photoelectric conversion element (event-based sensor) 1011 according to the present exemplary embodiment will be described. The event-based sensor counts the number of incident photons, and determines a timing when the number of counted photons exceeds a predetermined threshold. In addition, the event-based sensor measures a required time (number of clocks) for the number of photons to reach a first threshold for each pixel, and compares the required times to detect a luminance change. Specifically, assuming that the previously-measured required time is represented by T0 and the last required time is represented by T, if a difference T−T0 is more than or equal to a second threshold, a luminance change in a minus direction is detected. If a difference T0−T is more than or equal to the second threshold, a luminance change in a plus direction is detected. If the difference between T and T0 is less than the second threshold, no luminance change is detected. The second threshold is a value greater than or equal to "0". A preset value or a value which is set depending on another parameter is used as the second threshold.

A more detailed configuration of the photoelectric conversion element 1011 will be described below. FIG. 2A illustrates a configuration example of the photoelectric conversion element 1011. The photoelectric conversion element 1011 includes a pixel unit 110 and a peripheral circuit 120. The peripheral circuit 120 includes a vertical arbitration circuit 121 and a horizontal read-out circuit 122.

FIG. 2B illustrates a configuration example of each pixel unit included in the event-based sensor. The pixel unit 110 includes a photoelectric conversion unit 111, a pixel counter 112, a time counter 113, a first determination circuit 114, a memory 115, a comparator 116, a second determination circuit 117, a response circuit 118, and a selection circuit 119. The photoelectric conversion unit 111 includes an avalanche photodiode (single-photon avalanche photodiode (SPAD)) that operates in a Geiger mode, and is configured to cause the pixel counter 112 to count the number of photons incident on the photoelectric conversion unit 111. The time counter 113 counts the time during which photons are incident on the photoelectric conversion unit 111. The configuration of the event-based sensor using the SPAD makes it possible to detect a luminance change corresponding to a one-photon level. By detecting a luminance change corresponding to the one-photon level, the address event signal can be obtained even in a dark state, for example, during night time.

When the number of photons counted by the pixel counter 112 reaches the first threshold, the first determination circuit 114 causes the time counter 113 to stop counting the time. The memory 115 stores the previous count values obtained by the time counter 113. The count value corresponding to the difference between the current count value of the time counter 113 and the previous count value of the time counter 113 is obtained using the comparator 116.

In a case where the difference count value is more than or equal to the second threshold, the second determination circuit 117 transmits a request signal to the vertical arbitration circuit 121 through the response circuit 118. The response circuit 118 receives a response indicating that an output of address event data is "enabled" or "disabled" from the vertical arbitration circuit 121. In a case where the difference count value is less than the second threshold, the request signal is not transmitted.

In response to the response circuit 118 receiving a response indicating that the output is enabled, the selection circuit 119 outputs the count value from the time counter 113 to the horizontal read-out circuit 122. The horizontal read-out circuit 122 outputs the received count value as an output signal from the photoelectric conversion element 1011 to a detection unit.

The difference count value calculated by the comparator 116 corresponds to the reciprocal of the frequency of incident photons. Accordingly, the photoelectric conversion element 1011 according to the present exemplary embodiment includes a function of measuring a "change in the frequency of incident photons", that is, a luminance change. Further, the second determination circuit 117 is used to output an address event only in a case where the difference between time intervals between the respective times when the frequency of incident photons reaches the first threshold is more than or equal to the second threshold. In other words, the photoelectric conversion element 1011 is configured such that, in a case where the difference between the frequencies of incident photons is more than or equal to the second threshold, the frequency of incident photons is output, and if the difference is less than the threshold, the frequency of incident photons is not output. The above-described configuration enables realization of the asynchronous-type photoelectric conversion element that detects in real time a luminance change as an address event for each pixel address.

<Variations of Photoelectric Conversion Element>

The exemplary embodiment described above illustrates an example of using the photoelectric conversion element 1011 that detects a change in the frequency of incident photons by measuring the time during which photons are incident using the SPAD as the photoelectric conversion unit 111. However, any photoelectric conversion elements other than the photoelectric conversion element 1011 illustrated in FIGS. 2A and 2B can be used as long as the photoelectric conversion element is an asynchronous-type photoelectric conversion element that detects in real time a luminance change as an address event. For example, a photoelectric conversion element that detects a luminance change as a voltage change as discussed in Japanese Patent Application Laid-Open No. 2020-72317 may be used.

Figure 3:
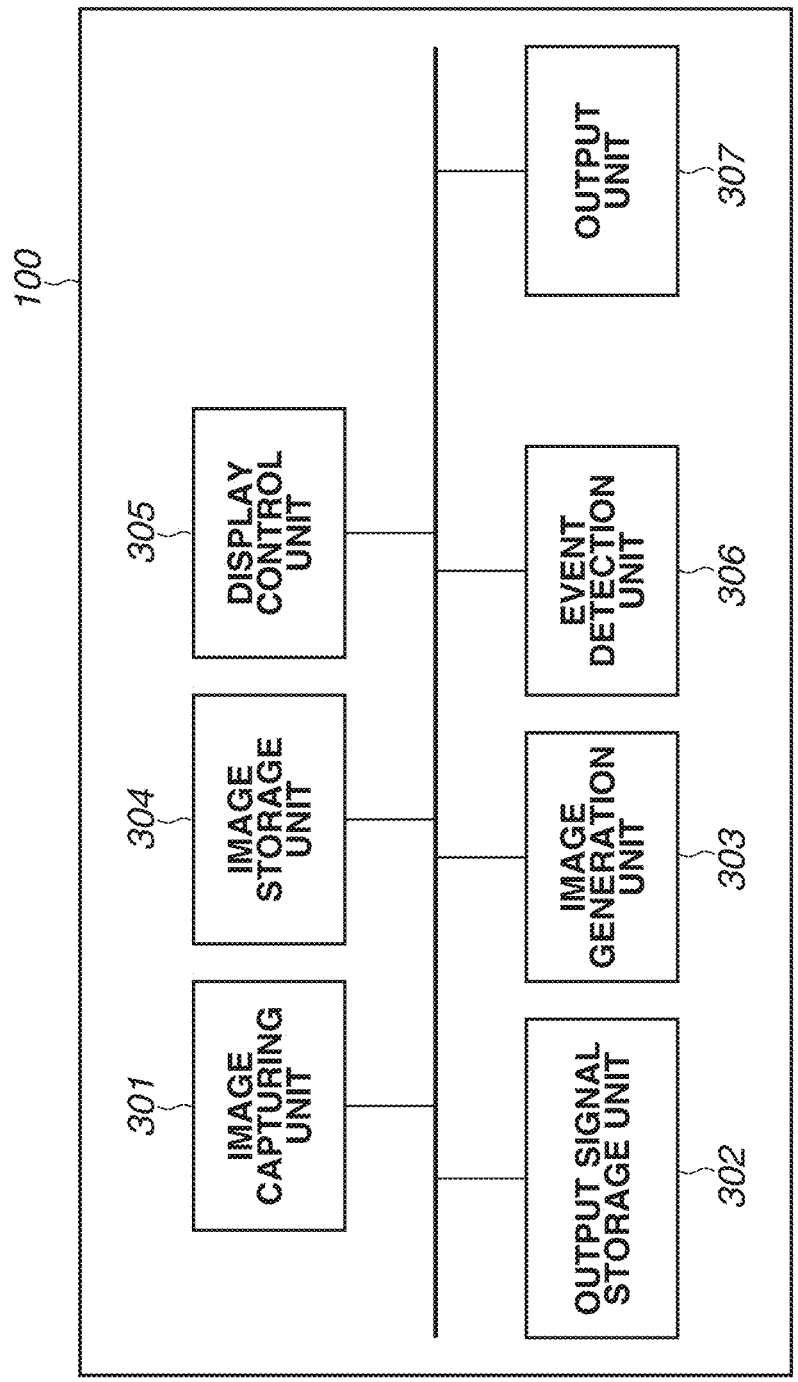
FIG. 3 is a block diagram illustrating a functional configuration example of the information processing apparatus.

<Functional Configuration Example of Image Capturing Apparatus 100: FIG. 3>

FIG. 3 is a block diagram illustrating a functional configuration example of the image capturing apparatus (information processing apparatus) 100 according to the present exemplary embodiment. The image capturing apparatus (information processing apparatus) 100 includes an image capturing unit 301 (corresponding to the image capturing unit 101 illustrated in FIG. 1), which includes the image capturing optical system 1010 and the photoelectric conversion element 1011, an output signal storage unit 302, an image generation unit 303, an image storage unit 304, a display control unit 305, an event detection unit 306, and an output unit 307. The image capturing unit 301 captures an image of a subject and acquires an address event signal. A subject image (not illustrated) is projected on the image capturing optical system 1010 and an optical filter, which is not illustrated and can be omitted. The optical image is formed on the photoelectric conversion element 1011. The photoelectric conversion element 1011 is a so-called DVS (event-based sensor) which detects a change in a luminance value of the subject image, and outputs a signal only in a case where the change is detected. The image capturing unit 301 causes the photoelectric conversion element 1011 to asynchronously output the coordinates of a pixel where a change occurs, the direction of the change, and the time (time stamp) when the change occurs. The image capturing unit 301 has a mechanical structure for controlling an aperture, zooming, and focusing, and is controlled by an image capturing optical system control unit (not illustrated). The output signal storage unit 302 stores the address event signal output from the photoelectric conversion element 1011. The image generation unit 303 generates frame data at regular intervals based on the address event signal stored in the output signal storage unit 302. The generated frame data is stored in the image storage unit 304, or is output to the output unit 307.

The image storage unit 304 stores the generated frame data. The event detection unit 306 detects whether an event (different from an address event) occurs based on an output of an asynchronous signal that is obtained from the photoelectric conversion element 1011 and is associated with a change in the luminance value of the subject. The display control unit 305 operates especially in a case where no event is detected, and outputs frame data to which information is added to the output unit 307 so as to improve the visibility of the subject image. More specifically, in a case where the subject stops moving, the display control unit 305 controls the display indicating the location of the subject to be superimposed on frame data based on frame data different from the current frame data so as to indicate the presence of the subject. The output unit 307 outputs the frame data to the display unit 104 or an external display apparatus.

Figure 4:
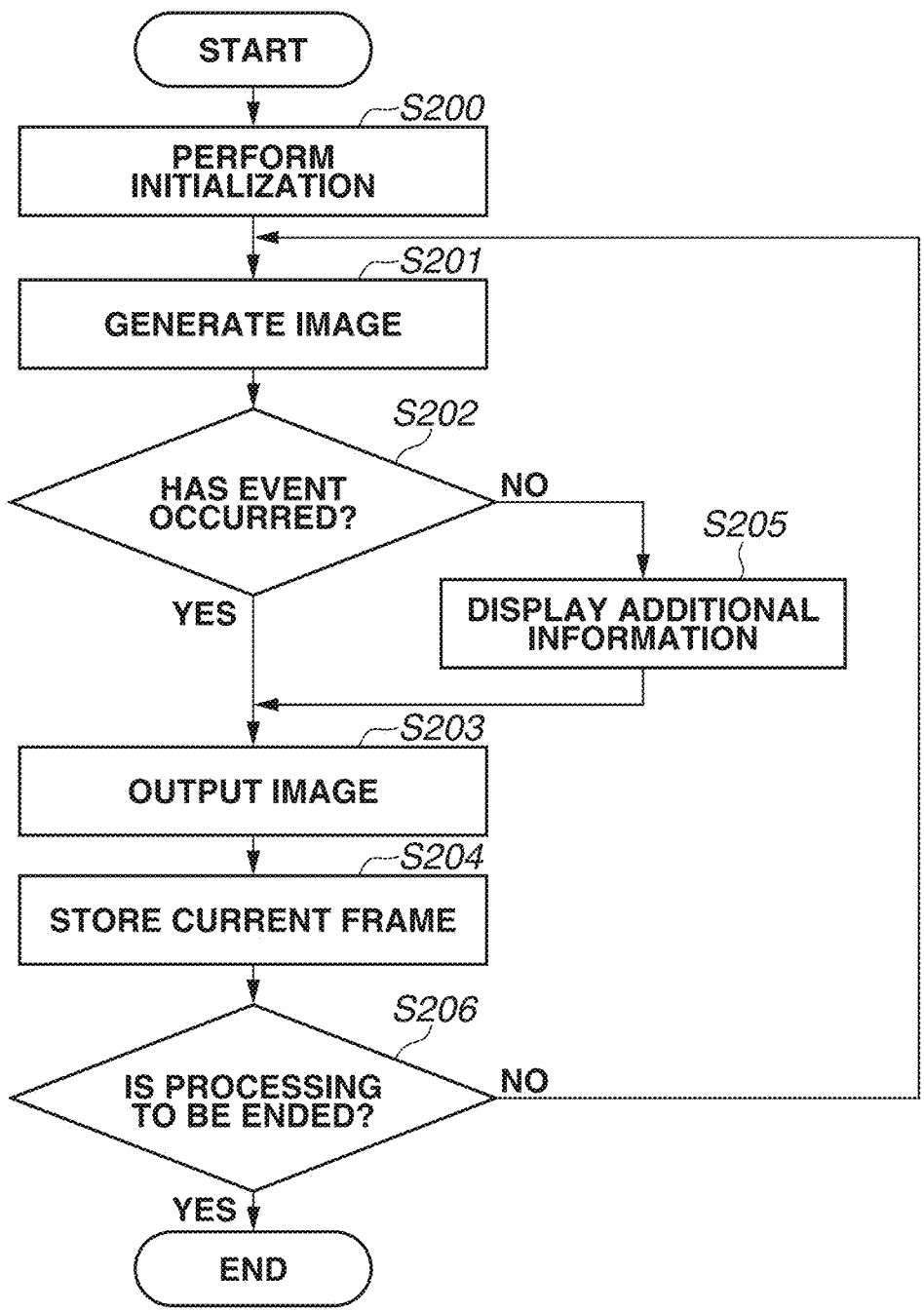
FIG. 4 is a flowchart illustrating processing to be executed by the information processing apparatus.
Figure 5:
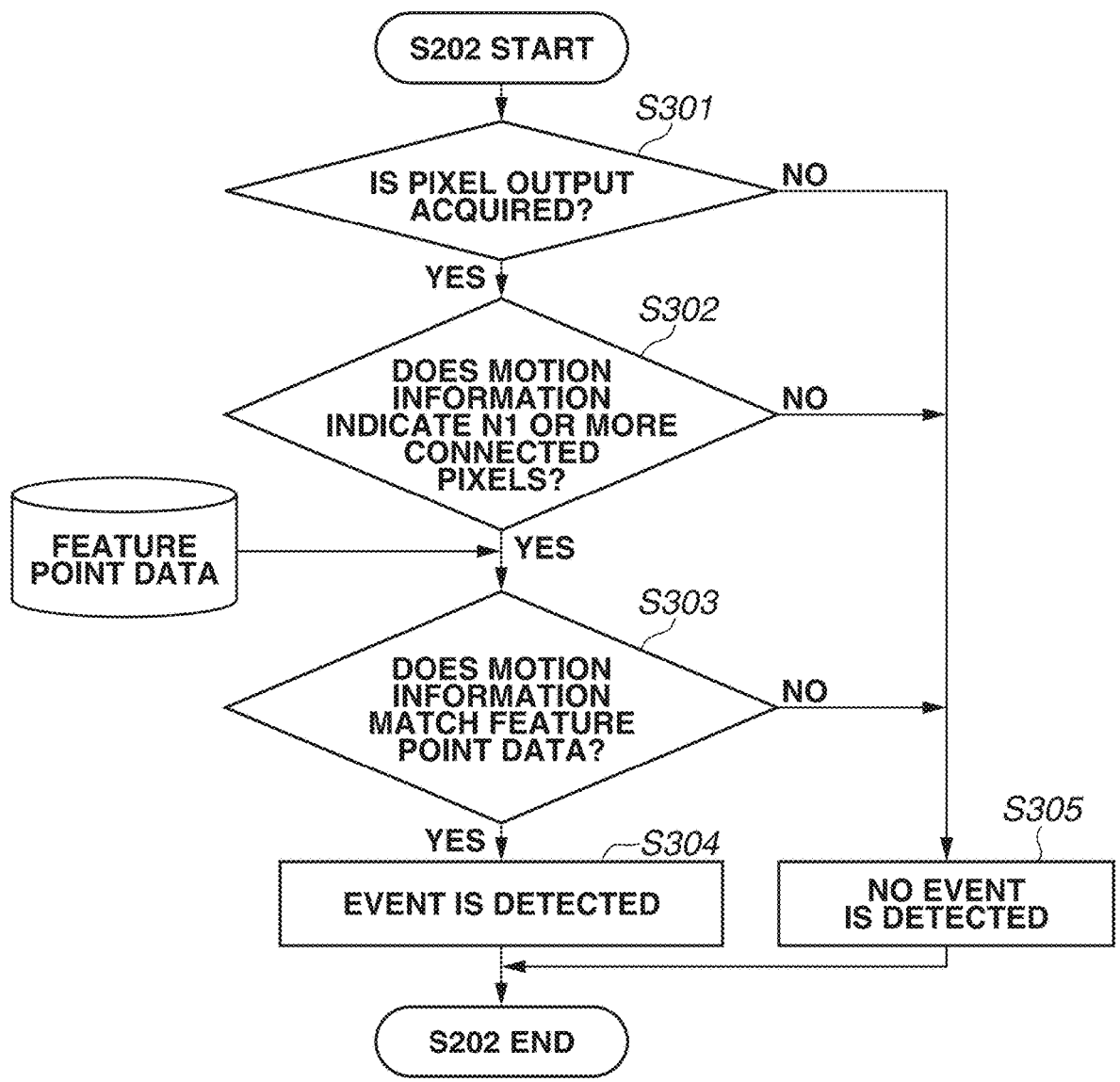
FIG. 5 is a flowchart illustrating processing to be executed by the information processing apparatus.

<Flowcharts: FIGS. 4 and 5>

FIG. 4 is a flowchart illustrating an example of processing to be executed by the image capturing apparatus (information processing apparatus) 100 to carry out the present exemplary embodiment. In step S200, the image capturing apparatus 100 performs initialization. For example, setting values and the like of the image capturing apparatus 100 are reset to default values. In step S201, the image generation unit 303 generates an image based on the address event signal indicating a location of a pixel where a luminance change occurs and time when the luminance change occurs. In this example, address event signals for the respective pixels are combined at regular intervals to generate one piece of frame data. More specifically, the image generation unit 303 generates an image in which each pixel is represented by two values such that a pixel with a luminance change is represented by one and a pixel with no luminance change is represented by zero. Each pixel in the image may be represented by three values depending on the direction of a luminance change. In step S202, the event detection unit 306 determines whether a predetermined event has occurred based on the asynchronous signal obtained from the photoelectric conversion element 1011. In the present exemplary embodiment, assume that the predetermined event is detection of a moving subject (in this case, however, assume that the image capturing apparatus 100 is in a stationary state). In step S202, if it is determined that an event has occurred (YES in step S202), the processing proceeds to step S203. In step S202, if it is determined that no event has occurred (NO in step S202), the processing proceeds to step S205. If no event is detected in step S202, in step S205, the display control unit 305 controls the display so that the generated image is superimposed by additional information on a region where motion information detected in the preceding frame is not detected. This processing will be described in detail below. In step S203, the output unit 307 outputs the image generated in the image generation unit 303, or the display image controlled by the display control unit 305 to the display unit 104. The image output in this case is an image for which an event is detected, and thus the location where the event has occurred can be visually recognized. In step S204, the image storage unit 304 stores the image of the current frame generated by the image generation unit 303. In step S206, the image capturing apparatus 100 determines whether to continue the processing. This determination may be made based on a condition such as a lapse of a predetermined period from start-up. A determination that the processing is to be ended may be made based on an instruction from the user.

The operation in step S202 illustrated in FIG. 4 will now be described in detail with reference to FIG. 5. FIG. 5 is a flowchart illustrating detailed processing of step S202. Initially, in step S301, the event detection unit 306 determines whether a pixel output is acquired from the image capturing unit 301. If the event detection unit 306 acquires a pixel output, the event detection unit 306 determines that motion information is present (YES in step S301), and the processing proceeds to step S302. The term "motion information" used herein simply refers to a pixel output (i.e., an address event signal). If no pixel output is acquired (NO in step S301), the processing proceeds to step S305. In step S305, the event detection unit 306 determines that "no event is detected", and then the operation in step S202 is ended. In step S302, the event detection unit 306 determines whether the motion information indicates a number of connected pixels more than or equal to a first threshold N1. If the number of connected pixels is more than or equal to the first threshold N1 (YES in step S302), the event detection unit 306 determines that the output is not noise. The term "the number of connected pixels" herein used refers to the number of connected (adjacent) pixels each including a pixel output at the same time stamp (or in a certain period) on a two-dimensional plane. If the motion information indicates the number of connected pixels less than the threshold N1 (NO in step S302), the processing proceeds to step S305. In step S305, the event detection unit 306 determines that "no event is detected", and then the operation in step S202 is ended. If the number of connected pixels is more than or equal to the first threshold N1 and the event detection unit 306 determines that the output is not noise, this determination result may be used as the result of step S202. More preferably, the processing may proceed to step S303 and the event detection unit 306 may perform comparison processing using stored feature point data on the preceding frames. In the comparison processing, a data set indicating any subject shapes to be detected is preliminarily stored as feature point data in the output signal storage unit 302, and the similarity between the feature point data and the contour of the subject is calculated.

A feature point data generation method will now be described. The feature point data includes at least contour information which is a set of pixels each including a pixel value that is more than or equal to a predetermined value. For example, the same time stamp (or a certain period) is treated for one piece of frame data, and this frame data is searched in order from the upper left (it may be desirable to perform pre-processing, such as integration, if a certain period is treated for one piece of frame data). If there is a second pixel that is not searched and includes another pixel output in the vicinity of eight first pixels where the pixel output is present, a sequence number S1 and a relative direction D1 from the first pixel to the second pixel, with reference to the first pixel, are stored. The relative direction D1 is represented by values corresponding to eight directions by setting a certain direction with respect to a coordinate system as zero and assigning numbers one, two, three, . . . " to the respective directions, every 45 degrees clockwise (or counterclockwise) with respect to the direction "0". The sequence number indicates the number of continuous pixels in the relative direction, in other words, the length of a point group indicating the same contour shape. The initial value of the sequence number is one. For example, in a case where the relative direction "111" is continuously obtained, the sequence number in this case is "3". More specifically, if there is a third pixel that is not searched and includes another pixel output in the vicinity of eight second pixels, a relative direction D2 from the second pixel to the third pixel, with respect to the second pixel, is stored. In this case, if the relative direction D2 matches the previously-stored relative direction, the previously-stored sequence number is added by one, instead of storing the relative direction. These operations are repeatedly performed until an end of the contour or a starting point pixel is reached, and an information set including the obtained relative direction and the sequence number is set as acquired contour information A1. Further, the series of operations is performed on all pixels, thus obtaining the acquired contour information for all pixel outputs. It may be more desirable to normalize the sequence number with a maximum value "one" for each acquired contour information.

In step S303, the event detection unit 306 calculates the similarity between the acquired contour information and the feature point data preliminarily stored. The term "feature point data" used herein refers to data indicating a direction group and a sequence number for the direction group obtained by a method similar to the above-described method. For example, calculations are performed using the total of distances of two curves where the horizontal axis represents the relative direction and the vertical axis represents the sequence number. If the similarity is more than or equal to a threshold C having any value, it is determined that the acquired contour information matches the feature point data. In step S303, if it is determined that the motion information matches the stored feature point data (YES in step S303), the processing proceeds to step S304. In step S304, the event detection unit 306 determines that an event is detected, and then the processing of step S202 ends. In step S303, if it is determined that the motion information does not match the stored feature point data (NO in step S303), the processing proceeds to step S305. In step S305, the event detection unit 306 determines that no event is detected, and then the operation in step S202 is ended. In this case, there is a possibility that the detected motion information indicates a new subject detection result, and thus the motion information is stored in the output signal storage unit 302. As described above, if the similarity to the captured motion information is more than or equal to the threshold C, it is determined that a desired subject shape is detected and that an event has occurred.

In addition, there may be a case where a desired subject shape is determined in advance and it is estimated that the subject is within an angle of view and is not currently moving (no pixel output in a region including the subject is obtained). In this case, it may be preferable, in terms of processing load, to perform the processing of determining whether a pixel output is acquired in step S301 only on the region where it is estimated that the subject is present, instead of performing the processing on all pixels.

For example, in a case where a vehicle is set as a subject to be monitored, if the vehicle moves into the angle of view and is identified as the vehicle with a camera and then the vehicle stops, no pixel output is acquired as a matter of course. However, since the region where it is estimated that the vehicle is present can be easily determined with the camera, it may be preferable, in terms of processing load, to ignore pixel outputs from regions other than the region where it is estimated that the vehicle is present and to monitor only the region where it is estimated that the vehicle is present.

In other words, the event detection unit 306 may determine a detection target region based on the previous event detection result. As the motion information used to determine whether the output is noise, pixel outputs at the same time stamp may be used, or pixel outputs during a certain time stamp period $T_{width}$ may be regarded and used as the output at the same time. Additionally, it is determined that the output is noise only in a case where the number of connected pixels is more than or equal to the threshold N1 in step S302 illustrated in FIG. 5. In this case, however, a condition that the number of connected pixels is less than a third threshold N2 (more than N1) may be added. This makes it possible to eliminate a situation where the entire imaging plane is changed due to, for example, an occurrence of flicker. Each of the thresholds and time stamp intervals may have any value.

An image generation method in the image generation unit 303 will be described with reference to FIGS. 6A and 6B. The image generation unit 303 generates frame data indicating a location of a pixel where a luminance change occurs based on the number of output event address signals from the pixels acquired at predetermined intervals. The horizontal axis represents a time stamp and the vertical axis represents the number of pixels output at the same time stamp. In general, pixel outputs in each interval are integrated at any time stamp interval $T_{width}$, and the resultant is output as respective frames (FIG. 6A). In general, in a case where the occurrence of an event cannot be detected as described above (e.g., an interval between t2 to t3), an image (e.g., f2-1) generated in the immediately preceding frame is displayed.

The display image generation method is not limited to this method. An integration interval for generating an image may be reset and a regenerated image may be displayed (FIG. 6B). More specifically, the processing of regenerating an image may be added between the operation in step S202 and the operation in step S205 in FIG. 4. In other words, the image generation unit 303 generates frame data indicating a location of a pixel where a luminance change occurs based on the number of output event address signals from the pixels acquired during a predetermined period.

Figure 7B:
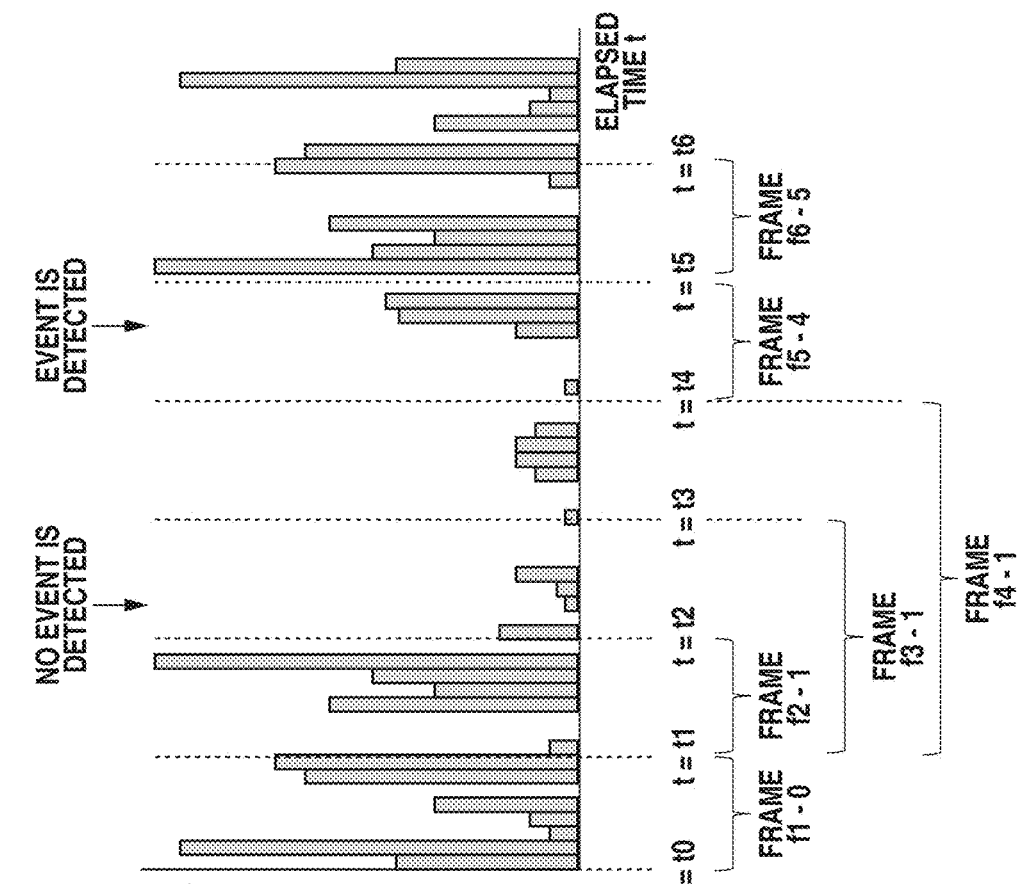
FIGS. 7A to 7C each schematically illustrate an example of the display frame generation method.
Figure 7A:
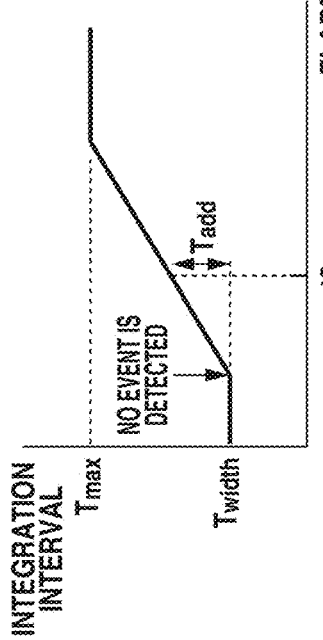
Figure 7C:
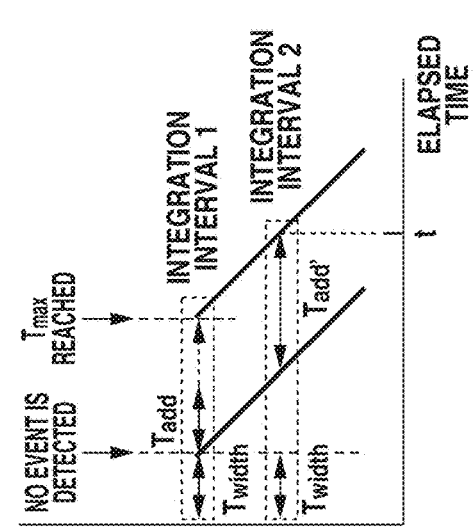

The time stamp interval $T_{width}$ used for integration may be dynamically controlled (FIGS. 7A to 7C). The image generation unit 303 generates frame data indicating a location of a pixel where a luminance change occurs based on the number of output event address signals from the pixels acquired during a dynamically-determined period. For example, frames generated by adding an interval $T_{add}$ between a time when no event is detected and a time when an event is detected and the integration interval $T_{width}$ in the immediately preceding frame are displayed in a certain cycle. Specifically, as illustrated in FIG. 7B, in a case where no event is detected during a period from time t2 to t3, the integration is performed during the interval from time t1 to the current time. In this example, frames are displayed in the cycle of $T_{width}$. In a case where an event is detected next time, the addition of integration intervals is cancelled and the processing returns to the normal frame generation processing. In actual use, an upper limit may be provided for the addition of integration intervals. If the addition result deviates from the upper limit, the integration interval $T_{width}$ in the immediately preceding frame is still used to avoid a lack of subject information. Instead of using the intervals $T_{add}$ for integration in chronological order, new signals obtained until the current time may be used for integration. In such a case, it is easy to determine whether drawing processing is interrupted, or whether no subject image is actually captured (FIG. 7C).

Simply displaying the frames generated by the above-described method is not sufficient to determine whether the subject is currently moving when the subject is viewed from a video viewer. Accordingly, the display control unit 305 performs processing in order to indicate that the currently-displayed frame has not changed from the preceding frame. For this purpose, the display control unit 305 operates mainly in a case where no event is detected.

FIGS. 8A to 8E each illustrate an example of an image to which information is added by the display control unit 305. Assume herein that the subject with a luminance change in a positive direction is generally displayed in white, and the subject with a luminance change in a negative direction is displayed in black. Also, assume that the subject with no luminance change is displayed in gray (indicated by diagonal lines or the like in the drawings) that is an intermediate color between white and black.

In the example illustrated in FIG. 8A, the subject that is not moving is displayed in the color between, in terms of brightness, the color with a luminance change and the color with no luminance change. It may be desirable to use the intermediate color between these colors. In the example illustrated in FIG. 8B, the color of the subject that is not moving is displayed by changing the saturation and hue of the image. In the example illustrated in FIG. 8C, a tracking frame corresponding to the subject is displayed such that the color of the frame corresponding to the subject that is not moving is different from the color of the frame corresponding to the subject that is moving. The examples illustrated in FIGS. 8A to 8C are advantageous in that the subject that is not moving is visually recognizable. In the example illustrated in FIG. 8D, information about an elapsed time from a time when the subject stops moving is additionally displayed. This method is advantageous in that the elapsed time from the time when the subject stops moving can be determined. In the example illustrated in FIG. 8E, the subject image is displayed such that a currently-generated frame F_new is superimposed on a frame F_recent that has changed from the immediately preceding frame. Any value may be set as a superimposition ratio, and the superimposition ratio may be dynamically changed depending on an elapsed time from a time when the subject stops moving. For example, an information addition unit may be caused to constantly operate. In a case where it is determined that an event is detected, the superimposition ratio is set as F_recent:F_new=0:1. Assuming that the elapsed time from the time when no event is detected to the current time is represented by T_elps, F_recent:F_new=1−1/T_elps:1/T_elps can be set as the ratio in a case where it is determined that no event is detected. This method is advantageous in that the user can recognize the image that has changed from the immediately preceding frame and the currently-acquired image at the same time.

While the above-described exemplary embodiment mainly illustrates an example where information is added mainly to a subject that is not moving, the present exemplary embodiment is not limited to this method. Information may be added to a moving subject.

While the present exemplary embodiment illustrates an example where the present exemplary embodiment is implemented using the configurations included in a single image capturing apparatus, the present exemplary embodiment is not limited to this example. The image capturing apparatus can be separated into two apparatuses. For example, an apparatus A that includes the image capturing function, including the image capturing unit 301, may be connected to an apparatus B that includes the signal processing and display functions, including the output signal storage unit 302, the image generation unit 303, the image storage unit 304, the display control unit 305, the event detection unit 306, and the output unit 307.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-097306, filed Jun. 10, 2021, which is hereby incorporated by reference herein in its entirety.

What is claimed is:

1. An apparatus comprising:
   at least one memory storing instructions; and
   at least one processor that executes the stored instructions that cause the at least one processor to:
   acquire a signal indicating a location of a pixel where a luminance change occurs and time when the luminance change occurs from an image capture device;
   acquire an event that is detected based on the signal;
   cause a display device to display a first image indicating the pixel where the luminance change occurs based on the acquired signal in a case where the event is detected; and
   cause the display device to display a second image, which includes a third image where the event was previously detected, in a case where the event is not detected.

2. The apparatus according to claim 1, wherein the event depending on presence or absence of the pixel where the luminance change occurs is detected.

3. The apparatus according to claim 2, wherein the event is detected in a case where the number of connected pixels indicating the number of continuous pixels in the signal acquired during a first period is more than or equal to a first threshold.

4. The apparatus according to claim 2, wherein the event is detected in a case where the signal acquired during the first period is similar to feature point data indicating a contour of a subject, the feature point data being preliminarily stored.

5. The apparatus according to claim 1, wherein the event is detection of a moving subject.

6. The apparatus according to claim 5, wherein, in a case where the moving subject detected in a preceding frame is not detected in a current frame, the second image is displayed.

7. The apparatus according to claim 1, wherein the stored instructions further cause the at least one processor to generate an image indicating a location of a pixel where a luminance change occurs based on the number of output event address signals in respective pixels acquired at intervals.

8. The apparatus according to claim 7, wherein the third image is generated based on the signal acquired during a period.

9. The apparatus according to claim 8, wherein the third image is generated based on the signal acquired during the period dynamically determined.

10. The apparatus according to claim 1, wherein the third image is displayed with at least one of hue, saturation, and brightness of the third image changed.

11. The apparatus according to claim 10, wherein the second image is displayed with at least one of hue, saturation, and brightness of a subject in the third image.

12. The apparatus according to claim 1, wherein a frame corresponding to a subject is displayed in the second image.

13. The apparatus according to claim 1, wherein the second image is generated by superposing the third image onto a fourth image based on a signal when the event is not detected.

14. The apparatus according to claim 1, wherein the second image is generated by combining the third image with a fourth image based on a signal when the event is not detected.

15. The apparatus according to claim 1, wherein the signal is output from a sensor configured to detect a change in luminance of each pixel, and in a case where no luminance change is detected, the signal is not output, or that no luminance change is detected is indicated.

16. The apparatus according to claim 1, wherein the signal is output from a photoelectric conversion element including a pixel for outputting a signal based on photon incidence.

17. A method comprising:
    acquiring an event based on a signal indicating a location of a pixel where a luminance change occurs and time when the luminance change occurs from an image capture device;
    acquiring an event that is detected based on the signal;
    causing a display device to display a first image indicating the pixel where the luminance change occurs based on the acquired signal in a case where the event is detected; and
    causing the display device to display a second image, which includes a third image where the event was previously detected, in a case where the event is not detected.

18. The method according to claim 17, wherein the detecting detects the event depending on presence or absence of the pixel where the luminance change occurs.

19. A non-transitory computer-readable storage medium storing a program for causing a computer to perform a method, the method comprising:
    acquiring an event based on a signal indicating a location of a pixel where a luminance change occurs and time when the luminance change occurs from an image capture device;
    acquiring an event that is detected based on the signal;
    causing a display device to display a first image indicating the pixel where the luminance change occurs based on the acquired signal in a case where the event is detected; and
    causing the display device to display a second image, which includes a third image where the event was previously detected, in a case where the event is not detected.

20. The non-transitory computer-readable storage medium storing a program according to claim 19, wherein the detecting detects the event depending on presence or absence of the pixel where the luminance change occurs.

* * * * *